United States Patent
Barendregt et al.

(10) Patent No.: US 11,402,333 B2
(45) Date of Patent: Aug. 2, 2022

(54) METHOD FOR CHEMILUMINESCENT SULPHUR DETECTION AND A FURNACE

(71) Applicant: AC Analytical Controls B.V., Rotterdam (NL)

(72) Inventors: Erwin Barendregt, Brielle (NL); Michiel Makkee, Rockanje (NL)

(73) Assignee: AC Analytical Controls B.V., Rotterdam (NL)

( * ) Notice: Subject to any disclaimer, the term of this patent is extended or adjusted under 35 U.S.C. 154(b) by 593 days.

(21) Appl. No.: 16/330,548

(22) PCT Filed: Sep. 6, 2017

(86) PCT No.: PCT/NL2017/050582
§ 371 (c)(1),
(2) Date: Mar. 5, 2019

(87) PCT Pub. No.: WO2018/048300
PCT Pub. Date: Mar. 15, 2018

(65) Prior Publication Data
US 2021/0285886 A1    Sep. 16, 2021

(30) Foreign Application Priority Data

Sep. 6, 2016    (NL) .................................... 2017426

(51) Int. Cl.
*G01N 21/76*    (2006.01)
*G01N 30/88*    (2006.01)
(Continued)

(52) U.S. Cl.
CPC ........... *G01N 21/766* (2013.01); *G01N 30/74* (2013.01); *G01N 30/88* (2013.01); *G01N 31/005* (2013.01); *G01N 2030/8859* (2013.01)

(58) Field of Classification Search
CPC ...... G01N 21/766; G01N 30/88; G01N 30/74; G01N 31/12
(Continued)

(56) References Cited

U.S. PATENT DOCUMENTS 3,084,031 A    4/1963    Kuck et al.
4,352,779 A *  10/1982   Parks .................. G01N 21/766
                                              422/52

(Continued)

FOREIGN PATENT DOCUMENTS

CA    2094939    * 10/1994
CA    2159657    *  5/1997
(Continued)

OTHER PUBLICATIONS

Burdge, J. R. et al, Journal of High Resolution Chromatography 1994, 17, 22-24.*
(Continued)

*Primary Examiner* — Arlen Soderquist
(74) *Attorney, Agent, or Firm* — Snyder, Clark, Lesch & Chung, LLP

(57) ABSTRACT

The invention is directed to a method for chemiluminescent sulphur detection wherein the method comprises the following steps. (a) oxidation of a gaseous starting mixture comprising one or more sulphur compounds to obtain an oxidized gas mixture. (b) reduction of the oxidized gas mixture as obtained in step (a) to obtain a gaseous mixture of reduced sulphur compounds in the presence of a ceramic surface. (c) reacting the mixture of reduced sulphur compounds obtained in step (b) with ozone to obtain a sulphur compound in excited state and measuring a chemiluminescent emission of the sulphur compound in excited state to obtain a measure for the amount of sulphur compounds in the gaseous starting
(Continued)

Figure 1:
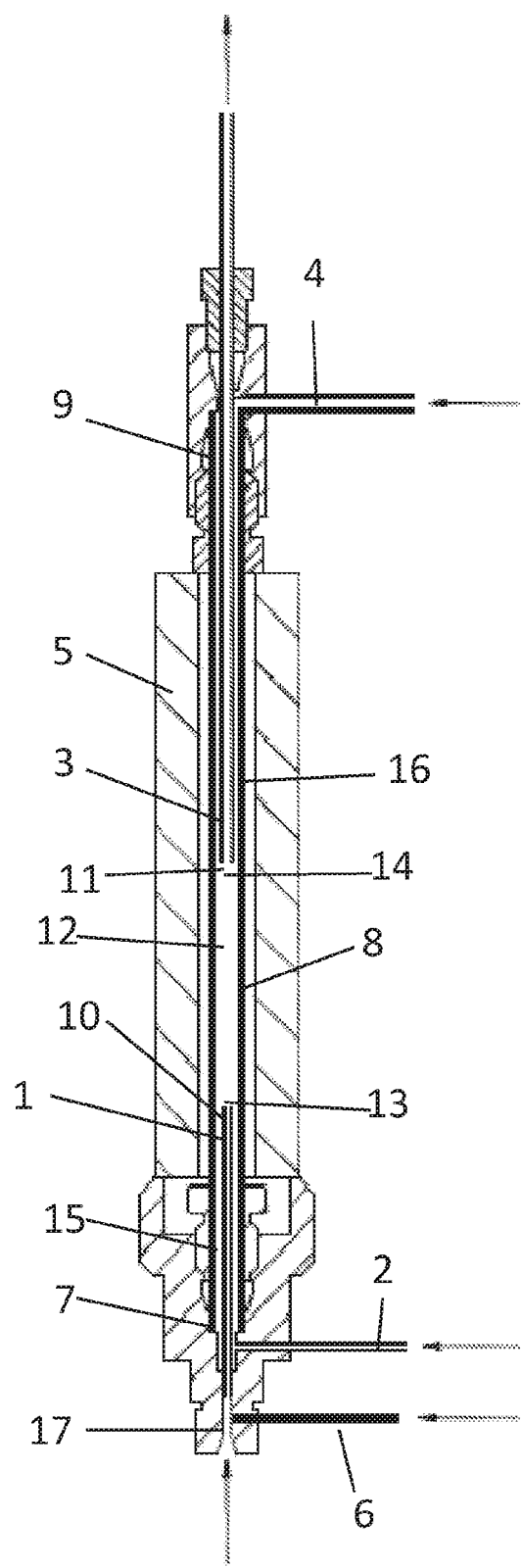

mixture. The ceramic surface in step (b) is a magnesium aluminium silicate comprising surface.

16 Claims, 2 Drawing Sheets

(51) Int. Cl.
  *G01N 30/74* (2006.01)
  *G01N 31/12* (2006.01)
  *G01N 31/00* (2006.01)

(58) Field of Classification Search
  USPC ....... 436/119–122, 155, 160; 422/52, 89, 91
  See application file for complete search history.

(56) References Cited

U.S. PATENT DOCUMENTS

| | | | | |
|---|---|---|---|---|
| 4,525,141 | A * | 6/1985 | DeWerth | F23D 14/70 431/347 |
| 5,227,135 | A * | 7/1993 | Godec | G01N 21/766 422/52 |
| 5,424,217 | A * | 6/1995 | Benner | G01N 31/12 436/119 |
| 5,501,981 | A | 3/1996 | Ray et al. | |
| 5,614,417 | A * | 3/1997 | Kubala | G01N 33/287 436/119 |
| 5,916,523 | A | 6/1999 | Yan et al. | |
| 6,130,095 | A | 10/2000 | Shearer | |
| 6,458,328 | B1 * | 10/2002 | Wreyford | G01N 31/12 422/69 |
| 2003/0032194 | A1 * | 2/2003 | Wreyford | G01N 31/12 422/78 |
| 2010/0118301 | A1 * | 5/2010 | Vondras | G01N 33/0042 356/318 |
| 2019/0383748 | A1 * | 12/2019 | Barendregt | G01N 21/766 |
| 2020/0003695 | A1 * | 1/2020 | Horiike | G01N 30/84 |

FOREIGN PATENT DOCUMENTS

| | | | |
|---|---|---|---|
| GB | 1540275 A | | 2/1979 |
| JP | 2015-59876 | * | 3/2015 |
| WO | 92/19964 | * | 11/1992 |

OTHER PUBLICATIONS

Sharma, N. K., Masters Thesis 1997, 155 pages, downloaded from https://prism.ucalgary.ca/bitstream/handle/1880/26842/31402Sharma.pdf?sequence=1&isAllowed=y.*

MacTaggart, D. L. et al, Atmospheric Environment 1999, 33, 625-632.*

Yan, X., Journal of Chromatography A, 1999, 842, 267-308.*

Konishi, N. et al, Journal of Propulsion and Power 2002, 18, 199, 204.*

Power, D. V., SAE Transactions 1979, 88, 860-878.*

Md. Hasan Zahir, Influences of heat treatment and DeNOx performance of cordierite honeycombs washcoated with spinel catalysts, Materials Chemistry and Physics, vol. 130, Issue 3, Aug. 18, 2011, pp. 1038-1045.

International Search Report and Written Opinion issued for the corresponding international application No. PCT/NL2017/050582 dated Mar. 2, 2018, 15 pages.

Randall L. Shearer, Development of Flameless Sulphur Chemiluminescence Detection: Application to Gas Chromatography. Anal. Chem. 1992, vol. 64, pp. 2192-2196.

Priscilla L. Burrow & John W. Birks, Flow Tube Kinetics Investigation of the Mechanism of Detection in the SCD. Anal Chem. 1997, vol. 69, pp. 1299-1306.

* cited by examiner

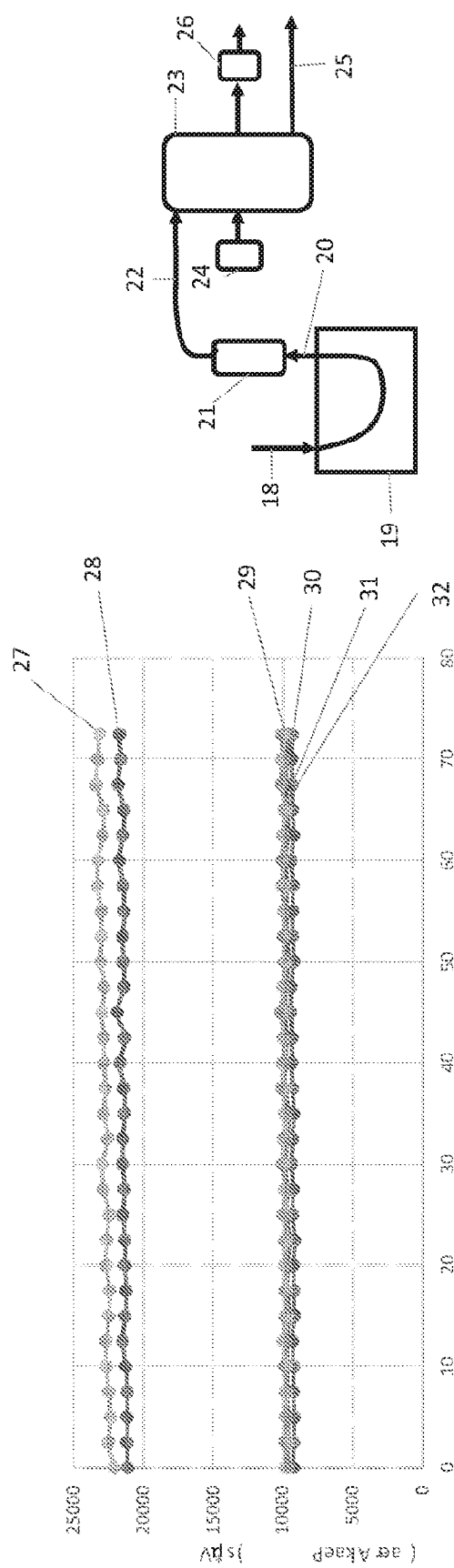

METHOD FOR CHEMILUMINESCENT SULPHUR DETECTION AND A FURNACE

The invention is directed to a method for chemiluminescent sulphur detection and to a furnace suited for chemiluminescent sulphur detection.

Methods for quantitative chemiluminescent sulphur detection are well known and for example described in U.S. Pat. Nos. 6,130,095, 5,501,981 and 5,916,523. The method described in U.S. Pat. No. 5,916,523 involves an oxidation of a gaseous starting mixture comprising of one or more sulphur compounds to obtain an oxidized gas mixture. The oxidized gas mixture is subsequently reduced to obtain a gaseous mixture of reduced sulphur compounds. The mixture of reduced sulphur compounds reacts with ozone to obtain a sulphur compound in excited state. By measuring the chemiluminescent emission of the sulphur compound in excited state a measure for the amount of sulphur compounds in the gaseous starting mixture is obtained. The oxidation and reduction is performed in a furnace. The furnace is typically a ceramic tube according to this publication. Commercially used furnaces typically comprise of a tube made of pure alumina.

A disadvantage of the method described in U.S. Pat. No. 5,916,523 is that the analytical performance of the method may be improved. Analytical performance includes stability, sensitivity and selectivity.

The object of the present invention is to provide a method for chemiluminescent sulphur detection which has an improved analytical performance over the known methods as for example described in the afore mentioned prior art publication. This object is achieved by the following method.

Method for chemiluminescent sulphur detection wherein the method comprises the following steps:

(a) oxidation of a gaseous starting mixture comprising one or more sulphur compounds to obtain an oxidized gas mixture, (b) reduction of the oxidized gas mixture as obtained in step (a) to obtain a gaseous mixture of reduced sulphur compounds in the presence of a ceramic surface, (c) reacting the mixture of reduced sulphur compounds obtained in step (b) with ozone to obtain a sulphur compound in excited state and measuring a chemiluminescent emission of the sulphur compound in excited state to obtain a measure for the amount of sulphur compounds in the gaseous starting mixture, wherein the ceramic surface in step (b) is a magnesium alumina silicate comprising surface.

Applicants found that by performing step (b) of this method in the presence of a magnesium alumina silicate comprising surface an improved analytical performance is obtained, while maintaining a comparable equimolarity. It is believed that at the magnesium alumina silicate surface the reduction reactions take place.

The invention is also directed to a furnace suited for oxidation of a gaseous starting mixture comprising of one or more sulphur compounds to obtain an oxidized gas mixture and reduction of the oxidized gas mixture to obtain a gaseous mixture of reduced sulphur compounds comprising of an inlet conduit for the gaseous starting mixture, an inlet for supply of an oxygen comprising gas, an outlet conduit for the mixture of reduced sulphur compounds, an inlet for hydrogen and heating means, wherein the outlet conduit is comprised of a surface comprising magnesium alumina silicate.

The use of such a furnace in a method for chemiluminescent sulphur detection is advantageous because a higher stability will be achieved. The invention will be described in more detail below.

The gaseous starting mixture will comprise of one or more sulphur compounds. These sulphur compounds include sulphur oxides and compounds wherein sulphur is chemically bound in organic and inorganic compounds.

The gaseous starting mixture may be obtained from a liquid or gaseous sample. A liquid sample will have to be evaporated before being able to be subjected to step (a). The starting mixture is suitably obtained in a separation device. Preferably such a separation device is a gas chromatograph. The starting mixture may then in time have a variable composition. This allows to determine the origin of the sulphur in a sample as fed to the separation device. A starting mixture as obtained in a gas chromatograph will typically comprise a carrier gas.

Preferably the gaseous starting mixture comprises added hydrogen when contacting with oxygen or an oxygen comprising gas in step (a). This is advantageous because the hydrogen when contacted with oxygen at the elevated temperatures will self-ignite and provide locally a high temperature. This is preferred because this results in that less external heating is necessary. The amount of hydrogen is sub-stoichiometric relative to the amount of oxygen provided to step (a) such to have enough oxygen left to react with the sulphur compounds. Hydrogen may be added as such. Preferably hydrogen is added in admixture with a make-up gas, such as for example nitrogen, argon and preferably helium. More preferably this mixture of make-up gas and hydrogen is added to the gaseous starting mixture before performing step (a). Even more preferably the amount of make-up gas-hydrogen mixture added to the gaseous starting mixture in a mixing zone having a constant pressure. The pressure is held constant by varying the flow of make-up gas and optional hydrogen gas as supplied to said mixing zone. The over-pressure may be between 5 and 50 kPa. Having a mixing zone with a constant pressure is advantageous because the flows to step (a) will then be more constant and less dependent on any upstream process or device. In case the upstream device is a gas chromatograph fluidly connected to such a mixing zone a more defined flow in said gas chromatograph results. This is advantageous for better interpretation of the analytical results obtained in such a system.

The process conditions in steps (a)-(c) may be performed according to generally known chemiluminescent sulphur detection methods as for example described in U.S. Pat. No. 5,916,523 and in Shearer, R. L. Anal. Chem. 1992, 64, 2192-2196, "Development of Flameless SCD: Application to Gas Chromatography"; and Priscilla L. Burrow & John W. Birks, Anal. Chem. 1997, 69, 1299-1306, "Flow Tube Kinetics Investigation of the Mechanism of Detection in the SCD". A skilled person will know how to optimise and tune the method for chemiluminescent sulphur detection.

In step (a) a gaseous starting mixture comprising one or more sulphur compounds is subjected to oxidation to obtain an oxidized gas mixture. The oxidation in step (a) is suitably performed by contacting the gaseous starting mixture with oxygen or an oxygen comprising gas. The amount of oxygen and the conditions in step (a) should be sufficient to oxidize the entire amount of combustible compounds in the starting mixture into oxides. It is believed that the sulphur and sulphur compounds are converted to a sulphur oxide. The temperature in step (a) may be between 300 and 2200° C., preferably between 400 and 1200° C. The residence time is suitably sufficient to convert preferably all of the sulphur compounds to sulphur oxides. In step (a) any hydrocarbon components in the compounds will be converted to carbon oxides and water.

In step (b) the oxidized gas mixture as obtained in step (a) is subjected to reduction to obtain a gaseous mixture of reduced sulphur compounds. The reduction is suitably performed by contacting the oxidized gas mixture with hydrogen or a hydrogen comprising gas. The amount of hydrogen and the conditions in step (b) should be sufficient to reduce the oxidized sulphur compounds to reduced sulphur compounds capable of ozone induced chemiluminescent. Such compounds include without limitation hydrogen sulphide, sulphur, sulphur monoxide, polysulphides, HxSy compounds and any other sulphur compounds capable of ozone induced chemiluminescent as also described in more detail in Priscilla L. Burrow & John W. Birks, Anal. Chem. 1997, 69, 1299-1306, "Flow Tube Kinetics Investigation of the Mechanism of Detection in the SCD". The temperature in step (b) may be between 300 and 2200° C. and preferably between 400 and 1000° C. Preferably the temperature in step (a) is higher than in step (b). The residence time is suitably sufficient to convert preferably all of the sulphur oxides to the earlier referred to reduced sulphur compounds.

Step (b) is performed in a furnace comprising a ceramic conduit having a ceramic surface comprising of magnesium alumina silicate. It is found that when step (b) is performed in the presence of such a conduit a more stable method is obtained. The conduit may be made of entirely magnesium alumina silicate or may be comprised of magnesium alumina silicate or combination of magnesium alumina silicate and other materials. Preferably the conduit is made entirely of magnesium-alumina-silicate. Preferably the reduction in step (b) is performed in the presence of cordierite as the magnesium-alumina-silicate. When reference is made to these materials or to conduits or tubes made of these materials in this application it is to be understood that this also includes materials in which magnesium-alumina-silicate, preferably cordierite, is present next to other materials, for example ceramic materials, in contents of above 50 wt %, preferably above 70 wt % and more preferably above 90 wt %.

Step (a) is also suitably performed in a furnace and more suitably steps (a) and (b) are performed in the same furnace. Such a combined furnace is suitably a single elongated furnace wherein at one end of the furnace the oxidation of step (a) takes place in an oxidation zone and at the opposite end of the furnace the reduction of step (b) takes place in a reduction zone. Suitably at the end of the furnace at which the reduction takes place an outlet tube for the gaseous mixture of reduced compounds is present. The outlet conduit is suitably comprised of a surface comprising magnesium-alumina-silicate, preferably cordierite.

Suitably such a furnace is a furnace according to the invention comprising an inlet conduit for the gaseous starting mixture, an inlet for supply of an oxygen comprising gas, an outlet conduit for the mixture of reduced sulphur compounds, an inlet for hydrogen and heating means. Suitably the inlet conduit for the gaseous mixture is co-axially protruding one end of a larger conduit and the outlet conduit for the mixture of reduced sulphur compounds is protruding the opposite end of the larger conduit such that the facing ends of the inlet conduit and the outlet conduit are spaced away from each other defining an intermediate zone separating an oxidation zone from a reduction zone. The heating means are positioned at the exterior of the larger conduit. An ignitor may be present at the oxidation zone or in the intermediate zone. Because the compounds supplied to the furnace auto-ignite at the normal operating temperatures such an ignitor is suitably not present.

The inlet conduit for the gaseous starting mixture is suitably fluidly connected to an inlet for a make-up gas defining a mixing zone for the gaseous starting mixture and the make-up gas. Suitably the inlet for make-up gas is provided with a constant pressure valve suited to, in use, achieve a constant pressure in the mixing zone. This enables the constant pressure in the mixing zone as also described earlier. The make-up gas may comprise hydrogen next to a make-up gas, such as helium.

Suitably a first annular space is present between the interior of the larger conduit and the exterior of the inlet conduit and wherein the inlet for supply of an oxygen comprising gas is positioned at one end of the first annular space such that in use a stream of oxygen comprising gas flows from the inlet for supply of an oxygen comprising gas through the first annular space towards the intermediate zone. The inlet conduit for the gaseous mixture preferably has a relatively large pressure drop. Such a pressure drop in combination with the constant pressure in the optional upstream mixing zone results in a substantially constant and well-defined flow through said inlet conduit. This is advantageous for a good determination of the sulphur compounds. Further a second annular space is suitably present between the interior of the larger conduit and the exterior of the outlet conduit for the mixture of reduced sulphur compounds and wherein the inlet for hydrogen is positioned at one end of the second annular space such that in use a stream of hydrogen flows from the inlet for hydrogen through the second annular space towards the intermediate zone.

The larger conduit, inlet conduit and outlet conduit may have any cross-sectional shape. For practical reasons these conduits are suitably tubular. The inlet conduit and larger conduit may be made out of any high temperature resistant material, like for example selected metals or alloys, like steel and ceramic material, like silicas, aluminas, silica-aluminas, zirconias and the afore mentioned magnesium-alumina-silicate like for example cordierite. In a possible embodiment of the present invention the inlet conduit for the gaseous mixture may be made of steel and the larger conduit made of alumina and the outlet conduit made of magnesium-alumina-silicate. Suitably at least two heating means are present along the length of the larger conduit which heating means can independently from each other heat the exterior of the larger conduit such that the temperature in the oxidation zone can be different, preferably higher, from the temperature in the reduction zone.

In step (c) the mixture of reduced sulphur compounds obtained in step (b) is reacted with ozone to obtain a sulphur compound in excited state also referred to as meta-stable sulphur compounds. Reaction with ozone and measuring a chemiluminescent emission of the sulphur compound in excited state in step (c) may be performed according to well-known methods in well-known apparatuses as for example described in the aforementioned patent and articles.

The invention is also directed to the use of the furnace according to the invention for chemiluminescent sulphur detection and preferably the chemiluminescent sulphur detection is according to the invention.

FIG. 1 shows a furnace according to the invention having a steel inlet tube (1) for the gaseous starting mixture, an inlet (2) for supply of an oxygen comprising gas, an outlet tube (3) made of cordierite for the mixture of reduced sulphur compounds, an inlet (4) for hydrogen, heating means (5). The steel inlet tube (1) for the gaseous starting mixture is co-axially protruding one end (7) of a larger tube (8). The outlet tube (3) protrudes the opposite end (9) of the larger tube (8) such that the facing open ends (10, 11) of the inlet tube (1) and the outlet tube (3) are spaced away from each other defining an intermediate zone (12) separating an oxidation zone (13) from a reduction zone (14) and wherein the heating means (5) are positioned at the exterior of the larger tube (8). An inlet (6) for supply of a make-up gas and hydrogen is shown which fluidly connects at a mixing zone (17) upstream the steel inlet tube (1) for the gaseous starting mixture. The arrows indicate the flow direction.

FIG. 1 also shows a first annular space (15) present between the interior of the larger tube (8) and the exterior of the inlet tube (1) and wherein the inlet (2) for supply of an oxygen comprising gas is positioned at one end of the first annular space (15) such that in use a stream of oxygen comprising gas flows from the inlet (2) for supply of an oxygen comprising gas through the first annular space (15) towards the oxidation zone (13) and intermediate zone (12). A second annular space (16) is present between the interior of the larger tube (8) and the exterior of the outlet tube (3). The inlet (4) for hydrogen is positioned at one end of the second annular space (16) such that in use a stream of hydrogen flows from the inlet (4) for hydrogen through the second annular space (16) towards the reduction zone (14) and intermediate zone (12).

FIG. 2 shows a sulphur detection system for detecting sulphur in a sample (18) to be analysed. Shown is a gas chromatograph (GC)(19) to which a sample (18) is fed. The sample (18) may be a liquid sample, like for example a sulphur containing crude oil derived fraction, which will be quickly heated in the GC to fully evaporate. The different components will be separated in the capillary column of the GC (19) and in time be supplied as the starting mixture (20) to a furnace (21) according to the present invention. Furnace (21) may be a furnace as shown in FIG. 1. In the furnace steps (a) and (b) of the method according to the invention will take place. An effluent (22) comprising sulphur compound is fed to an optical detector (23) in which step (c) takes place. To optical detector (23) ozone is fed as generated in ozone generator (24). In the optical detector (23) the sulphur compounds react with ozone to sulphur compounds in excited state which create chemiluminescence which in turn is detected by a photo sensitive device as part of detector (23). The output of detector (23) is an electrical signal (25) being a measure for the sulphur concentration in the injected liquid sample (18). The reaction products are continuously discharged from optical detector (23) by means of a vacuum pump (26). The invention is also directed to a system for chemiluminescent sulphur detection as illustrated in FIG. 2 comprising a gas chromatograph, a furnace according to the invention, an ozone generator and an optical detector.

The invention shall be illustrated by the following examples.

Example 1

The following example illustrates results obtained by sulfur chemiluminescence using an outlet tube made from cordierite. The system is set up according FIG. 2. The sample feed was taken from an Agilent 7890 GC using a 1 µL split injection with a split ratio of 1:10, meaning that 1 part out of 10 is sent towards the furnace. The GC was equipped with a capillary column having a MXT-1 (Restek) stationary phase, a dimension of 30 m×0.32 mm ID and a film thickness of 4 µm. The inlet temperature was set towards 250° C. Column flow was set towards 4.0 ml/min. The GC was temperature programmed at 25° C./min from 100° C. (1 min isothermal) to 210° C. (144.6 min isothermal).

The effluent was provided to a furnace as in FIG. 1 having a cordierite outlet tube. The cordierite outlet tube had a length of 135 mm, internal diameter of 1.5 mm, outer diameter of 5 mm and one inlet opening. The cordierite material was obtained from Superior Technical Ceramics Corp. The pressure in the mixing zone upstream the inlet for the gaseous mixture was maintained at 10 kPa overpressure using helium. Together with helium 12 ml/min hydrogen was provided. To the inlet for oxygen containing gas 60 ml/min air was provided. To the reduction zone 80 ml/min hydrogen was supplied. The mixing zone temperature was 350° C. The temperature in the oxidation zone was 950° C. and the temperature in the reduction zone was 725° C. The pressure within the furnace was 196 Torr. The effluent of the furnace was provided to an optical detector.

To the above system a standard sample consisting of thiophene, diethylsulfide, dimethyldisulfide, 4-methylthiazole, benzothiophene and benzothiazole in o-xylene was provided. Sampling was repeated over an extended period of 70 hours. In FIG. 3 the measured peak area expressed in µV*s for thiophene (30), diethylsulfide (31), dimethyldisulfide (32), 4-methylthiazole (28), benzothiophene (29) and benzothiazole (27) is provided. This Figure shows no significant deviation between the measurements in time were found, indicating a good stability.

Example 2

Example 1 was repeated and the stability, sensitivity and equimolarity were determined. The stability is defined as the change in sulfur response of the detector over time when an identical sample is repeatedly analyzed by the same sulfur chemiluminescent analyzer. This change is expressed in terms of the relative standard deviation over the found results (peak areas) for the repeated analyses. The smaller this RSD value is the better the stability of the detector.

Sensitivity is defined as the lowest amount of sulfur that can be detected per time interval as expressed in pg/s by the detector wherein the lower the value the more sensitive the detector.

Equimolarity is defined as the uniformity in response factors of the detector for different sulfur containing components. This uniformity is expressed as the relative standard deviation (RSD) over the different response factors (RF). The smaller this RSD value is the better the equimolarity.

HC Selectivity is defined as the ratio between the response of the detector towards sulfur and the response of the detector towards hydrocarbons. The higher this ratio is the better the HC selectivity of the detector.

The stability, sensitivity, equimolarity and HC selectivity are measured three times and the average results are presented in Table 1.

Comparative Experiment A

Example 2 was repeated except that an 99.7% alumina tube was used as outlet tube instead of the cordierite outlet tube. The average results for stability, sensitivity, equimolarity and HC selectivity are presented in Table 1.

TABLE 1

|  | Example 1 Cordierite outlet tube | Comparative experiment A Alumina outlet tube |
|---|---|---|
| Stability (RSD) | 0.67 | 1.88 |
| Sensitivity (fg/s) | 27 | 54 |
| Equimolarity (RSD over RF) | 2.84 | 3.90 |
| Selectivity | $3.7 \cdot 10^8$ | $1.1 \cdot 10^8$ |

The comparative results presented in Table 1 show that the method employing a cordierite outlet tube is better in terms of stability, sensitivity and HC selectivity when compared to the same method using an alumina outlet tube.

The invention claimed is:

1. A method for chemiluminescent sulphur detection,. wherein the method comprises the following steps:
 (a) oxidation of a gaseous starting mixture comprising one or more sulphur compounds to obtain an oxidized gas mixture,
 (b) reduction of the oxidized gas mixture as obtained in step (a) in the presence of a ceramic surface to obtain a gaseous mixture of reduced sulphur compounds,
 (c) reacting the mixture of reduced sulphur compounds obtained in step (b) with ozone to obtain a sulphur compound in an excited state and measuring a chemiluminescent emission of the sulphur compound in the excited state to obtain a measure for an amount of sulphur compounds in the gaseous starting mixture,
 wherein the ceramic surface in step (b) is a cordierite comprising surface.

2. The method according to claim 1, wherein in step (a) the oxidation is performed by contacting the gaseous mixture with oxygen or an oxygen comprising gas.

3. The method according to claim 2, wherein the gaseous starting mixture comprises added hydrogen when contacting with oxygen or an oxygen comprising gas.

4. The method according to claim 1, wherein in step (b) the reduction is performed by contacting the oxidized gas mixture with hydrogen or a hydrogen comprising gas.

5. The method according to claim 1, wherein step (a) and (b) are performed in a single elongated furnace wherein at one end of the furnace the oxidation of step (a) takes place in an oxidation zone and at the opposite end of the furnace the reduction of step (b) takes place in a reduction zone.

6. The method according to claim 5, wherein the reduction of step (b) takes place at the inlet opening of an outlet tube for the gaseous mixture of reduced compounds as present in the furnace and wherein the outlet tube at or near the inlet opening of said outlet tube is comprised of a surface comprising cordierite magnesium aluminium silicate.

7. The method according to claim 1, wherein the starting mixture is obtained in a separation device.

8. The method according to claim 7, wherein the separation device is a gas chromatograph.

9. The method according to claim 1, wherein the temperature in step (a) is between 400 and 1200° C.

10. The method according to claim 1, wherein the temperature in step (b) is between 400 and 1000° C.

11. A furnace suited for oxidation of a gaseous starting mixture comprising one or more sulphur compounds to obtain an oxidized gas mixture and reduction of the oxidized gas mixture to obtain a gaseous mixture of reduced sulphur compounds comprising:
 an inlet conduit for the gaseous starting mixture,
 an inlet for supply of an oxygen comprising gas,
 an outlet conduit for the mixture of reduced sulphur compounds,
 an inlet for hydrogen,. and
 heating means,
 wherein the outlet conduit is comprised of a surface comprising cordierite.

12. The furnace according to claim 11, wherein the inlet conduit for the gaseous starting mixture is fluidly connected to an inlet for a make-up gas defining a mixing zone for the gaseous starting mixture and the make-up gas upstream from the inlet conduit for the gaseous starting mixture and wherein the inlet for make-up gas is provided with a constant pressure valve configured to achieve a constant pressure in the mixing zone.

13. The furnace according to claim 11, wherein the inlet conduit for the gaseous mixture is co-axially protruding at one end of a larger conduit and the outlet conduit for the mixture of reduced sulphur compounds is protruding at the opposite end of the larger conduit such that the facing ends of the inlet conduit and the outlet conduit are spaced away from each other defining an intermediate zone separating an oxidation zone from a reduction zone and wherein the heating means are positioned at the exterior of the larger conduit.

14. The furnace according to claim 13, wherein a first annular space is present between the interior of the larger conduit and the exterior of the inlet conduit and wherein the inlet for supply of an oxygen comprising gas is positioned at one end of the first annular space such that in use a stream of oxygen comprising gas flows from the inlet for supply of an oxygen comprising gas through the first annular space towards the intermediate zone, and
 wherein a second annular space is present between the interior of the larger conduit and the exterior of the outlet conduit for the mixture of reduced sulphur compounds and wherein the inlet for hydrogen is positioned at one end of the second annular space such that in use a stream of hydrogen flows from the inlet for hydrogen through the second annular space towards the intermediate zone and wherein the outlet conduit at or near the inlet opening of said outlet conduit is comprised of a surface comprising the cordierite.

15. The furnace according to claim 13, wherein at least two heating means are present along the length of the larger conduit which heating means can independently from each other heat the exterior of the larger conduit such that the temperature in the oxidation zone can be different from the temperature in the reduction zone.

16. A system for chemiluminescent sulphur detection comprising a gas chromatograph, a furnace according to claim 11, an ozone generator and an optical detector.

* * * * *

UNITED STATES PATENT AND TRADEMARK OFFICE
CERTIFICATE OF CORRECTION

PATENT NO. : 11,402,333 B2
APPLICATION NO. : 16/330548
DATED : August 2, 2022
INVENTOR(S) : Erwin Barendregt et al.

It is certified that error appears in the above-identified patent and that said Letters Patent is hereby corrected as shown below:

In the Claims

Claim 1 at Column 7, Line 18 should read:
1. A method for chemiluminescent sulphur detection, Claim 6 at Column 7, Line 53 should read:
comprising cordierite.

Signed and Sealed this
Fifteenth Day of November, 2022

Katherine Kelly Vidal
*Director of the United States Patent and Trademark Office*